(12) United States Patent
Mathur

(10) Patent No.: US 11,138,196 B2
(45) Date of Patent: Oct. 5, 2021

(54) MAINTAINING DATA ACROSS QUERY EXECUTIONS OF A LONG-RUNNING QUERY

(71) Applicant: salesforce.com, inc., San Francisco, CA (US)

(72) Inventor: Rohitashva Mathur, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 467 days.

(21) Appl. No.: 15/998,854

(22) Filed: Aug. 17, 2018

(65) Prior Publication Data

US 2020/0057819 A1 Feb. 20, 2020

(51) Int. Cl.
*G06F 16/2455* (2019.01)
*G06F 16/22* (2019.01)
*G06F 16/23* (2019.01)
*G06F 16/2458* (2019.01)

(52) U.S. Cl.
CPC ...... *G06F 16/2455* (2019.01); *G06F 16/2282* (2019.01); *G06F 16/2379* (2019.01); *G06F 16/2471* (2019.01); *G06F 16/24558* (2019.01)

(58) Field of Classification Search
CPC ............. G06F 16/2282; G06F 16/2455; G06F 16/2471; G06F 16/24558; G06F 16/2379
USPC ................................................. 707/741, 769
See application file for complete search history.

(56) References Cited

U.S. PATENT DOCUMENTS

| | | | | |
|---|---|---|---|---|
| 7,051,020 | B2 * | 5/2006 | Dertinger | G06F 16/24568 707/999.002 |
| 7,447,680 | B2 * | 11/2008 | Day | G06F 16/24547 707/999.003 |
| 2004/0002961 | A1 * | 1/2004 | Dertinger | G06F 16/24568 707/999.003 |
| 2006/0026116 | A1 * | 2/2006 | Day | G06F 16/24547 707/999.001 |
| 2008/0270392 | A1 * | 10/2008 | Day | G06F 16/24547 707/999.005 |
| 2018/0276275 | A1 * | 9/2018 | Dou | G06F 16/284 |

* cited by examiner

*Primary Examiner* — Phong H Nguyen

(57) ABSTRACT

Disclosed herein are system, method, and computer program product embodiments for a query processing system. An embodiment operates by receiving a query associated with a table. An ordered index with entries that include key values that uniquely identifies a corresponding record in the table is determined. A last key value is initialized to store a minimum value for a data type of the key value. The query is executed as a union-all of a plurality of queries. While a count of selected records is less than or equal to a threshold quantity and at least one entry remains in the ordered index, an ordered next entry with a key value subsequent to the last key value in the index is identified, the corresponding record is selected from the table, the last key value is updated, the query is executed, and the count is incremented.

18 Claims, 4 Drawing Sheets

MAINTAINING DATA ACROSS QUERY EXECUTIONS OF A LONG-RUNNING QUERY

BACKGROUND

Long-running queries that are executed against large data sets residing in multi-version concurrency control (MVCC) databases often require significant processing and other computing resources to execute and complete. These queries may take minutes, hours, or even days to complete, during which time not only are the processing resources monopolized by the queries. Also, there a risk that in middle of processing that a particular data version may expire or a system crash may occur, requiring that the query is restarted from the beginning.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for maintaining data across query executions of a long-running query.

Figure 1:
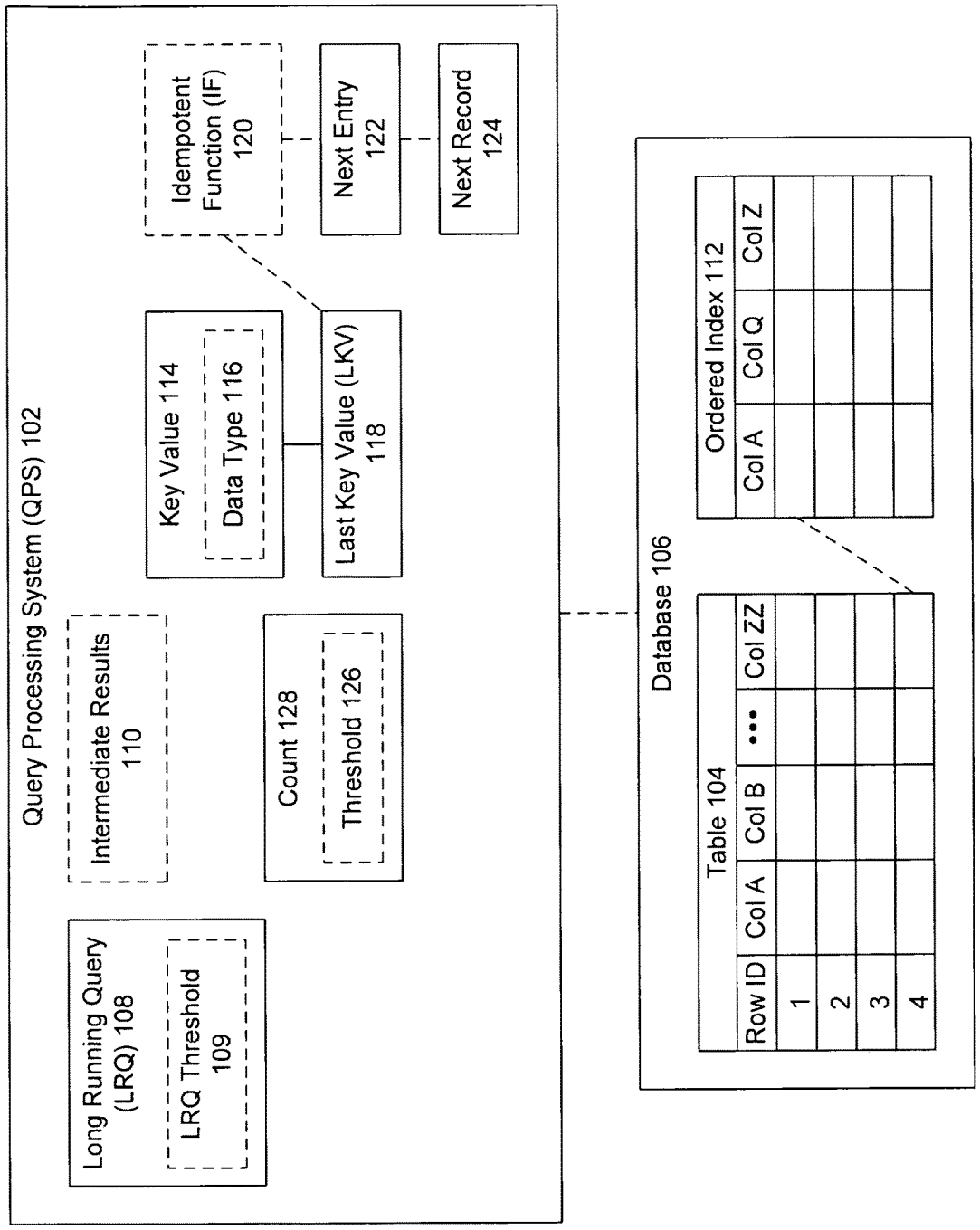
FIG. 1 is a block diagram illustrating example functionality for maintaining data across query executions of a long-running query, according to some embodiments.

FIG. 1 is a block diagram 100 illustrating example functionality for maintaining data across query executions of a long-running query, according to some embodiments. In the example of FIG. 1, a query processing system (QPS) 102 may receive and execute queries against the data of a database 106.

A query may include a search for data of database 106 that satisfies one or more query parameters. In an embodiment, a query may include a reference to one or more tables 104 or other subsets of data of database 106. QPS 102 may receive a query (from a user or another system), execute the query against the data of database 106, and return a result of an execution of the query against the data of the database. Executing the query may include identifying which tuples, records, or rows of the data (if any) satisfy the query parameters. As used herein, tuples, records, and rows may be used interchangeably.

The queries processed by QPS 102 may include both short-running queries and long-running queries 108. In different embodiments, QPS 102 may determine or classify different queries as being either long-running or short-running based on various LRQ threshold parameters 109 as described herein.

A long-running query (LRQ) 108 may be a query that is executed against a data set that exceeds a dataset threshold 109, for a quantity of data (e.g., number of records or tables) against which the LRQ 108 is to be executed. In another embodiment, LRQ 108 may be a query whose estimated execution time exceeds a time threshold 109. In another embodiment, LRQ 108 may be a query that requires resources (e.g., computing cycles, memory space) that exceed a resource threshold 109. In an embodiment, if an LRQ threshold 109 is exceeded by a particular query, QPS 102 may classify or designate the query as an LRQ 108.

A short-running or normal query, by contrast, may be any query that does not exceed an LRQ threshold parameter 109. Short-running queries may be executed by QPS 102 using conventional manners of query processing. For example, the query may be executed and a result may be returned. If the system crashes in the middle of the query execution, of the short-running query, the query may be aborted or restarted from the beginning.

However, an LRQ 108 poses additional technical challenges relative to executing short-running queries. If conventional manners of query processing are applied to executing LRQs 108, the execution of an LRQ 108 may monopolize processing resources for extended periods of time (which may cause other processes or programs to have to wait until the long-running query completes to use the query-monopolized resources, causing system delays).

If there is a system crash, failure, or other error that occurs during the execution of an LRQ 108, the system would have to restart the execution of the LRQ 108 from the very beginning. In addition to the processing resources already consumed, restarting a long-running query wastes additional time and processing resources. For example, if an LRQ 108 is being executed against a data set that includes ten million records, if a crash occurs after seven million of the records have been checked against the query, then the system would have to restart from the very beginning, checking all seven million records again.

Furthermore, conventional processing does not allow for intermediate results to be generated and shared in executing long-running queries. Instead, a user or system would have to wait until the long-running query has completed its execution.

Rather than allowing an LRQ 108 to monopolize processing resources for an extended period of time (e.g., beyond an LRQ threshold 109), QPS 102 may execute LRQ 108 as a set of multiple shorter-running queries. For example, QPS 102 may select portions or chunks of data from a table 104 corresponding to LRQ 108, and execute LRQ against the smaller chunks, such that each execution is less than LRQ threshold 109, and generate intermediate results 110. QPS 102 may union-all the intermediate results 110 of these shorter-running queries, and produce a final result (which may replace the one or more intermediate results 110) for the LRQ 108 when the shorter-running queries have completed execution against one or more records from table 104.

If a failure occurs during the execution of a shorter-running query, then QPS 102 may resume processing from the most recently completed shorter-running query, rather than starting from the beginning. QPS 102 may compute an intermediate result 110 for the subset or chunk of data, which may include one or more rows from table 104. In an embodiment, QPS 102 may stream and update intermediate results 110 to another device or display as the data of table 104 is being processed. QPS 102 may then also either release the shared resources or process the next row of the chunk, or the next chunk (set of one or more rows) from table 104. This process may repeat so long as there are rows of table 104 that have not been processed.

As noted above, QPS 102 may execute LRQ 108 as a set or series of shorter-running queries (against chunks of data from table 104) in a relaxed consistency model. The relaxed consistency model does not require that all the data returned as a result of the query (LRQ 108) belong to a single point in time. An MVCC (multi-version concurrency control) database is an example of a relaxed data consistency model database in which an LRQ 108 may be divided into or executed as shorter-running queries by QPS 102.

In a relaxed consistency model database, if the data of a record that has already been executed against the LRQ 108 (as a shorter running query) changes, the record does not need to be processed or executed against the LRQ 108 again. This enables database 106 to continue processing data updates (addition, deletion, modification of data) to table 104 while LRQ 108 is executing without wasting resources by re-processing previously processed records from table 104 or causing delays in processing the table updates (e.g., by allowing them to be processed simultaneously with LRQ 108 execution).

In an embodiment, QPS 102 may track which rows of table 104 were already processed against LRQ 102 by using an ordered index 112 (hereinafter referred to interchangeably as index or ordered index). Index 112 may include a copy of a subset of columns or data from table 104 that can be more efficiently searched (relative to searching all the data of table 104). Index 112 may include a corresponding for every row of table 104.

Index 112 may include a key value 114. Key value 114 may include one or more of the columns of data from index 112 that together uniquely identify a corresponding row from table 104. In an embodiment, key value 114 may include a single column from index 112, or multiple columns. In an embodiment, each key value 114 may be associated with a data type 116.

Data type 116 may be any category or type of data that may be stored in an entry of index 112 (or row of table 104). Example data types 116 include, but are not limited to: String, Integer, REAL, and Boolean. In a simple embodiment, index 112 may include a single key value 114 corresponding to a single column and a single data type 116. For simplicity sake, the embodiments as described herein will primarily focus on the simple embodiment in which index 112 includes a single key value 114. However it is understood that other embodiments, with multiple keys of key value 114 corresponding to multiple columns of index 112 and having varying data types 116, would be processed in a similar manner.

As shown in the example of FIG. 1, index 112 may include a smaller subset of the columns of table 104. For example, while table 104 may include columns A through ZZ (which may include 52 columns), index 112 may include 3 columns (A, Q, and Z). In other embodiments, index 112 may include any number of columns. And one or more of those columns may comprise a key value 114. If any column or combination of columns from index 112 (A, Q, or Z) uniquely identifies each record from table 104, that column or combination of columns may be the key value 114.

However, not all tables have indexes, and not all indexes reference all of the rows of a particular table. In an embodiment, if a particular table does not include an index (or one cannot be created), or the index does not reference all of the rows of the table (relevant to LRQ 108), then the LRQ 108 may be processed using conventional long-running query processing. Or, for example, if an index does not include a key value 114 that uniquely addresses each row in the base table 104, then conventional long-running query processing may also be performed when executing LRQ 108.

However, if an index 112 satisfies the above requirements, and either is ordered (e.g., in either ascending to descending order of key values 114) or may be ordered by QPS 102, then QPS 102 may select or use index 112 to execute LRQ 104 against smaller chunks of the data as described herein. If a particular table 104 has multiple ordered indexes 112, then QPS 102 may select any one of the indexes 112 that reference all of the rows or tuples of a particular table 104. In an embodiment, QPS 102 may select the index with the smallest number of columns that comprise a key value 114.

In an embodiment, the uniqueness of the index 112 (e.g., whether the index uniquely addresses each of the rows of table 104) may be determined based on an implicit or explicit definition of the index 112. For example, QPS 102 may determine whether index satisfies one or more of the index parameters from metadata that may be stored or read about the index 112. In an embodiment, QPS 102 may verify which columns of index 112 comprise a key value 114. For example, if column Q is always "New York" for all of the rows (or a particular number of rows exceeding a threshold), while column A indicates a social security number, then column A may be used by QPS 102 to track which rows have been processed and would be part of key value 114, while column Q would not be used.

As reference above, the index 112 may be ordered by its key values 114. While the order of the entries of index 112 may not correspond to the order of the rows of table 104, the ordering of the entries of index 112 may remain constant between executions. This consistency in index ordering may enable QPS 102 to use the ordered index 112 to track which rows have or have not yet been processed. QPS 102 may also pause or suspend the execution of LRQ 108 at various breakpoints (e.g., upon reaching a particular threshold 108), share resources with one or more other processes, and then resume execution by identifying a last key value (LKV) 118 from index 112.

LKV 118 may be the key value 114 of the index 112 entry corresponding to the table 104 row that was most recently executed against LRQ 108. Such that, when LRQ 108 execution is resumed (e.g., after a chunk of data has been processed, or shared resources have been returned to QPS 102), QPS 102 may identify the entry in ordered index 112 that is subsequent to the LKV 118. QPS 102 may then resume execution of LRQ 108 with the corresponding row from table 104.

In an embodiment, prior to executing LRQ 102 against rows of table 104 or selecting an entry from index 112, QPS 102 may initialize a last key value (LKV) 118 to a lowest possible value for a data type 116 of the key value 114. For example, QPS 102 may initialize LKV 118 to 0 or −1 for the data type 116 of a positive integer value. In an embodiment, LKV 118 may begin with an initialized NULL value. If, however, key value 114 includes data from multiple columns of index 112, then each key entry in key value 114 may be initialized for its respective data type 116.

After initialization of LKV 118, in a first iteration of LRQ 108, QPS 102 may select the first entry (or a first set of entries) from index 112, and process the corresponding row(s) from table 104 against LRQ 108. LRQ 108 may set to the last or most recently selected or processed entry from index 112 to LKV 118. Then, for example, in a second iteration, QPS 102 may check LKV 118 to determine where in index 112 to begin processing LRQ 108 (e.g., beginning at the subsequent or next entry 122).

Next entry 122 may be the entry in ordered index 112 with the next largest (in an ascending ordered index) key value 114 greater than LKV 118. In a descending ordered index, the next entry 122 may be the next smallest key value 114 of an entry that is less than LKV 118. Next entry 122 may correspond to a next record from table 104, which is executed against LRQ 108.

In an embodiment, an entry in an index 112 may include a disk or other address or link to the underlying or corresponding data or row from table 104. In an embodiment, QPS 102 may use this reference (from next entry 122) to select a chunk of one or rows from table 104 that correspond to the identified entries from index 112. QPS 102 may then set LKV 118 to the key value 114 corresponding to last or most recently executed row from the chunk.

In an embodiment, QPS 102 may use an idempotent function (IF) 120 to identify next entry 122. IF 120 may be a function that returns the same result with respect to a set of data no matter how many times it is executed or applied to that data. Example idempotent functions include an absolute value function, and a maximum value function. In another embodiment, a non-idempotent function may be used in lieu of IF 120.

In an embodiment, IF 120 may be a maximum value function that receives two entries from index 112 as arguments and returns the entry with the greatest key value 114. For example, a first argument may be LKV 118, and a second argument may be a second key value 114 from an entry selected from ordered index 112. IF 120 may identify whether the first or second argument is greater. If the second key value (non-LKV) is greater, then the corresponding entry may be identified as the next entry 122. However, if LKV 118 is greater, than another entry may be selected from index 112. In another embodiment, a non-idempotent function 120 may be used to compare LKV 118 against the key values 114 corresponding to entries of index 112 to determine next entry 122.

As noted above, tracking LKV 118 against ordered index 112 enables QPS 102 to pause, suspend, and resume the execution or processing of LRQ 108 against a particular data set or table 104. For each chunk of one or more records from table 104 that are processed, QPS 102 may generate an intermediate result 110. Intermediate result 110 may be streamed to an output device or combined with previous intermediate results 110 (from one or more previously processed rows or chunks).

In an embodiment, table 104 may include data that is stored in disk storage, which may be slower or require more resources for QPS 102 to access than data stored in the memory of one or more computing devices. As such, data from table 104 may be retrieved from disk storage and transferred to memory before it is executed against LRQ 108. In an embodiment, QPS 102 may select up to a chunk size or threshold 126 number of rows from table 104 to move into memory and against which to execute LRQ 108.

In an embodiment, threshold 126 may correspond to an amount of memory or cache space available to store data read or retrieved from database 106. In another embodiment, threshold 126 may be an administrator defined chunk size. A chunk may be a largest unit of physical disk space or data server data storage dedicated to be used for executing a particular query or data set. In an embodiment, threshold 126 may be determined based on what system resources are available, and may be dynamically altered or changed as more or fewer resources are available during a query execution.

In an embodiment, threshold 126 may correspond to the availability of processing resources to execute the LRQ 108. For example, during times of peak processing (e.g., during the middle of a business day), threshold 126 may be lower than during off-peak times, and may vary on an hourly, daily, or weekly basis.

In an embodiment, QPS 102 may track how many rows are being selected from table 104 based on a selection of corresponding entries from ordered index 112. For example, threshold 126 may be set to five. As such QPS 102 may select five key values 114 subsequent to LKV 118 from index 112, and retrieve the corresponding rows from table 104. QPS 102 may maintain and update a count 128 to track how many entries have been selected from index 112 and/or how many rows from table 104 have been selected and executed against LRQ 108. When count 128 equals threshold 126, or there are no more entries remaining in index 112, QPS 102 may stop retrieving additional rows from table 104.

In continuing the example above, QPS 102 may execute LRQ 108 against the five selected rows from table 104. This process may then repeat over multiple iterations (selecting entries from index 112, until count 128 equals threshold) until there are no more remaining entries in index 112 (e.g., and corresponding rows in table 104) to be executed against LRQ 108. At which point, the execution may complete a final result may be returned. Between each iteration, QPS 102 may release any shared resources to other processes.

As noted above, QPS 102 may maintain intermediate results 110 from processing the rows of table 104, in the various chunks, against LRQ 108. In an embodiment, the intermediate results 110 from a first row (or chunk of rows) may be combined with the intermediate results 110 from a second row (or chunk of rows) after LRQ 108 has been executed against the second set of one or more rows. In another embodiment, intermediate results 110 may be streamed to an output device or display and may be updated as rows are being processed. In an embodiment, QPS 102 may continually union all the intermediate results 110 of processing the smaller queries of LRQ 108. In various embodiments, intermediate results 110 may be stored in volatile memory (such as a cache), or a non-volatile memory (such as disk storage).

In an embodiment, QPS 102 may identify which table(s) 104 (or other sets of data) of database 106 are being referred to in LRQ 108. For example, LRQ 108 may include a statement (e.g., such as a FROM clause in SQL) that identifies one or more tables 104 of database 106 against which the query is to be executed. QPS 102 may identify the one or more tables 104 against which LRQ 108 is to be executed, and process LRQ 108 as described herein.

In an embodiment, if LRQ 108 reference to different tables 104, then different threads or other processors may be used to simultaneously process each of the various tables 104 against small LRQ 108 queries as described herein. For example, while a first processor is executing LRQ 108 against a first table 104, a second processor may simultaneously and in parallel execute LRQ 108 against a second table 104 in accordance with what is described herein.

In an embodiment, prior to selecting a first key value 114 from index 112, QPS 102 may initialize LKV 118 for each key and corresponding data type 116. For an ascending ordered index 112, QPS 102 may set LKV 118 to any value lower than the lowest value in the range of key values 114. For a descending ordered index, QPS 102 may set LKV 118 to any value larger than the largest value in the range of key values 114. In an embodiment, during initialization, entries from index 112 have been selected, and LKV 118 may be set to NULL. Then for example, the first value of ordered index 112 may be selected as any next value received or processed may be determined to be greater than (or less than) NULL. This may allow QPS 102 to iterate through the ordered index 112. Then, for example, after the first selection, LKV 118 may be set to the key value 114 corresponding to the first entry from index 112.

In an embodiment, the LKV 118 may either be stored at the end of processing a particular chunk of multiple rows from table 104, or after processing each row of the chunk. In an embodiment, LKV 118 may be stored in non-volatile memory and may enable QPS 102 to resume processing from the next entry 122 after the stored LKV 118 is retrieved. This may provide the ability to recover from the previous entry in case of a crash or other unexpected error.

In a data set of key values 114 including (1, 3, 4, 2, 6, 8, and 9), QPS 102 may determine a threshold 126 or chunk size is 3. After processing the first chunk or set of data values (1, 2, 3), LKV 118 may be set to 3 (which corresponds to the entry with the largest key value 114). Then, for example, in QPS 102 may process the next chunk at key value 4 (as next entry 122). At the end of processing the second chunk (4, 6, 8), LKV 118 may be set to 8. Then, in the next iteration, QPS 102 (e.g., using IF 120) may determine next entry 122 to be 9, and may complete processing because there are no more remaining entries after 9.

As another example, IF 120 may execute against key values 114 with multiple values (e.g., multiple columns from index 112 that are used to uniquely identify a row from table 104). For example, an entry or tuple T1 from index 112 may include values for columns A-N (A1, B1, C1 . . . N1), and tuple T2 may include values for the same columns of index 112 (A2, B2, C2 . . . N2).

IF 120 may perform a key value comparison (e.g., column-by-column or value-by-value) of T1 and T2 to determine which is larger. For example, IF 120 may compare A1 and A2, and if A1>A2, then T1 may be selected as LKV 118. However, if the values A1 and A2 are equal, IF 120 may then compare the B values, and on and on, until a decision may is made the one of the entries is found to be larger than the other. The Max function below may be either an idempotent function or non-idempotent function. An example comparison of the values is illustrated below.

Max (T1,T2)=T1 if A1>A2
Max (T1,T2)=T1 if A1=A2 and B1>B2
Max (T1,T2)=T1 if A1=A2 and B1=B2 and C1>C2
Max (T1,T2)=T1 if A1=A2 and B1=B2 and C1=C2 . . . N1>N2

The example above assumes that A is the most significant column or value (relative to B-N) in key value 114, and so begins with A. It also assumes B is the next most significant, all the way down to N which is the least significant. In an embodiment, the most significant column may correspond to an ordering of the index 112. For example, the entries of index 112 may be ordered by col A, then col B, then col C and so on. However, in other embodiments, N may be the most significant column, followed by D, followed by A, and the columns may be processed accordingly.

In an example, if table 104 has 33 records or tuples, and threshold 126 is set to 4, then the data set may be processed as 9 different smaller queries executions (4 rows in the first 8 executions, and 1 remaining row in the last execution). As noted above, index 112 may be an ordered index (e.g., in which the tuples or rows are arranged in ascending order), this may provide QPS 102 a guarantee that the next tuple will be greater than the previous one.

In an embodiment, a QPS 102 may include an ORDER BY operation to index 112 to ensure the ordering remains across different iterations or smaller query executions. For example, the ORDER BY operation may instruct a database engine to provide a certain, particular, or specified ordering of data (e.g., by ascending or descending key values 114).

With each chunk of data selected from index 112, the corresponding rows of table 104 may be executed against LRQ 108, and both the LRQ 118 and the intermediate results of processing 110 may be tracked (and optionally stored in non-volatile memory). However, as noted above, intermediate results 110 may be streamed and/or may be continually unioned or joined together to produce a single set of intermediate results 110. This may save memory or other storage space, by not storing multiple intermediate results 110. And this processing may continue so long as there are processing resources available to execute LRQ 108 or all the entries of index 112 (corresponding to rows of table 104) have been exhausted or processed, and the final result has been generated or returned.

QPS 102 may receive an original LRQ 108, which QPS 102 may split into or execute as a set of smaller union-all queries. In an embodiment, LRQ 108 may be written in SQL (structured query language) and include select, from, and where clauses.

An example LRQ 108 may be: SELECT <C> FROM T WHERE <O>. T may indicate one or more tables 104 against which the query is to be executed. <C> may indicate the original columns (of table 104) or expressions of the query against which the parameters or filters <O> of the LRQ 108 are to be executed.

QPS 102 may then identify whether a qualifying index 112 exists or may be generated for the identified table(s) T 104. As noted above, a qualifying index 112 may be an ordered index that includes a unique reference (e.g., key value 114) to each of the rows of table 104. If no such index exists or can be generated, then long running query processing may be used for LRQ 108.

If a qualifying index 112 is either generated or identified, key value 114 may take the form (k1, k2, k3) where k1 is the most significant index key or value of key value 114, followed by k2 and k3. As noted above, each keys of index (k1, k2, k3, etc.) may be of a particular data type 116 (e.g., String, Integer, REAL, etc.). The data types t1, t2, and t3 may correspond to keys k1, k2, and k3, respectively, such that t1 is the data type for key k1.

In an embodiment, QPS 102 may identify the minimum possible values for the data types 116 t1, t2, and t3, which may be represented as min(t1), min(t2), and min(t3), respectively. In another embodiment, QPS 102 may identify a range of values from the columns of ascending ordered index corresponding to k1, k2, and k3, and use those values as the minimum values. QPS 102 may initialize LKV 118 with the min value for each data type t1, t2, and t3 for each of the keys k1, k2, and k3 of key value 114.

In an embodiment, QPS 102 may select a chunk of rows from index 112, until count 128 equals threshold 126. QPS 102 may then process the corresponding chunk of rows of table 104, while tracking most recently processed value for k1, k2, and k3 from index 112. QPS 102 may store these values as last_k1, last_k2, and last_k3 of LKV 118, respectively.

In an embodiment, QPS 102 may re-write the original SQL query as a union-all of query, which may take the following form:

```
select * from ( -- #0
    select * from (
        select <access_path> k1, k2, k3, <C> from T where <O> &
        last_k1 = min(t1) & last_k2 = min(t2) & last_k3 =
        min(t3) order by k1 , k2 ,k3)   -- #1
    UNION ALL
    select * from (
        select <access_path> k1, k2, k3, <C> from T where T.k1 =
        last_k1 & T.k2 = last_k2 & T.k3 > last_k3 order
        by k1 , k2 ,k3) -- #2
    UNION ALL
    select * from (
        select <access_path> k1, k2, k3, <C> from T where T.k1 =
        last_k1 & T.k2 > last_k2 order by k1 , k2 ,k3 )   -- #3
    UNION ALL
    select * from (
        select <access_path> k1, k2, k3, <C> from T where T.k1 >
        last_k1 order by k1 , k2 ,k3 )   -- #4
    t where rownum <= 100 and collect_func(k1,k2,k3) != 0
```

The first select statement (denoted #0) may be a wrapping query, with #1-4 identifying each of the legs of the union-all query. The <access_path> may indicate that the index 112 is being used to access or identify rows of table 104 (as opposed to selecting rows directly from table 104). In other embodiments, <access_path> may not be explicitly specified. The 'order by' clause may ensure a consistent ordering of the index 112 (even if index 112 is already ordered). However in other embodiments, an order by clause may not be used.

Though not shown in the code above, LKV 118 may be initialized to a NULL or other smallest value (for an ascending ordered index 112) as described above. In an embodiment, if index 112 includes a NULL value as one of the keys in key value 114, the processing may be the same described herein. For example, in an ascending ordered index 112, NULL value may be treated as the lowest possible value for the data type 116.

The 'rownum' clause may indicate a limit on how many records are fetched or processed at once (e.g., corresponding to threshold 126). The value of rownum threshold 126 is set to 100 as provided in the example above, but is only illustrative of an example value, in other embodiments, this value may vary.

In an embodiment, the union-all components may be declared (as shown above) so as to access the earlier the rows of ordered index 112, which may be either an ascending or descending ordered index. The 'collect_func' clause is an example of an IF 120 that records the LKV 114 of the last processed entry. In an embodiment, collect_func may also track or flag when it was previously invoked or executed.

In the example above, the original column set <C> may be selected from table T (table 104). In an embodiment, the column set may be selected by selecting the corresponding primary key entries from index 112. Then, for example, QPS 102 may execute the query (e.g., based on parameters or filter <O>) against the set of rows and generate intermediate results 110. Intermediate results 110 may then be joined with any previously generated intermediate results 110.

In an embodiment, QPS 102 may generate the queries #1-4, as provided above. Since index 112 is ordered (ascending in the case of this example), the definition of the comparison order itself may lead directly to the generation of queries (#2, #3, #4, and #1) by QPS 102.

In an embodiment, index IND(k1, k2, k3) may include two entries: T1(k1, k2, k3) and T2(k1, k2, k3). If T1 is greater than T2 (T1 comes after T2 in ascending ordered index 112), then one of following rules must also be true:

1. T1.k1>T2.k1 (differ in the first most sig key) OR
2. T1.k1=T2.k1 & T1.k2>T2.k2 (differ in the second most sig key) OR
3. T1.k1=T2.k1 & T1.k2=T2.k2 & T1.k3>T2.k3 (differ in the third most sig key)

With this definition of comparison order for an ordered index 112 and the values (k1, k2, k3), QPS 102 may identify all the key values 114 for which (3) holds true. QPS 102 may also identify all the values for which (2) and (1) hold true. This is illustrated in the example above in the union queries #2, #3, and #4. When navigating the ordered index 112, entries that would be processed first would be those that differ only in the nth most significant key, and n−1th most significant key, and so on.

In an embodiment, the query components may be generated in reverse order because tuples matching (3) may come before, in comparison order, than those holding true for (2) for a given value of k2.

For N values, QPS 102 may store N variables (last_k1, last_k2, last_k3, . . . ) in LKV 118, for an N column index 112, which may be used to store the last processed value (k1, k2, k3 . . . kN). The last_variables may be initialized to min(t_1) . . . min(t_N) (in an ascending ordered index). As described above, T_i may correspond to the data type of k_i. For an N column index 112, there may be N conditions, for which QPS 102 may generate N union-all query components.

Query component #1 from the example above may be a seed component that is executed only once because of the predicates last_k1=min(t1) & last_k2=min(t2) & last_k3=min(t3) . . . ) yield at most X tuples (where X is the chunk size). The largest row or entry (in terms of index IND(k1, k2, k3) order is used to set values for last_k1, last_k2, last_k3 of LKV 118, and drive the looping over the union-all query until there are no more rows or entries returned from the union-all query). In an embodiment, this may return the first set of values of (k1 . . . kn).

In an embodiment, each of the remaining components may be generated as follows:
The 2nd union-all component:
  QPS 102 may begin with a select query that selects <C> and <k1 . . . kn> from T and specifies an order by <k1 . . . kn>. The predicates for this query component may include the original predicates and equality predicates for each of the <k1 . . . k_n−1> columns and > (greater than) predicate for the k_n. The values against which these predicates are evaluated may be the previously or most recently (last) processed values for each of them stored in the variables (last_k1, last_k2 . . . last_k_n) by collect_func(k1, k2, k3, . . . kn).
The i+1th union-all component:
  QPS 102 may begin with a select query that selects <C> and <k1 . . . kn> from T and specifies an order by <k1 . . . kn>. The predicates for this query component may include the original predicates and equality predicates for each of the <k1 . . . k i 1> columns and > (greater than) predicate for the k_i. The values against which these predicates are evaluated may be the previously or most recently (last) values for each of them stored in the variables (last_k1, last_k2 . . . last_k_i) by function collect_func(k1, k2, k3, . . . kn).

For example, ascending ordered index 112 may include 3 columns: name, age, and social security number (SS #), and may be ordered by SS # which is the key value 114. Table 104 may include 10 records, and threshold 126 may be set to 3. In a first iteration, LKV 118 may select the smallest three SS #s from index (which may be the first three entries), and set LKV 118 to the largest of the three SS #s. QPS 102 may execute LRQ 108 against the three rows from table 104 (which may not be the first three rows of table 104) corresponding to the selected entries from index 112 to generate intermediate results 110.

QPS 102 may then select the next three entries from index 112 and repeat the same process. QPS 102 may repeat this again for the following three entries from index 112. And then in the final iteration, select only the last entry from index 112 since there are no more remaining and return a final result.

In another embodiment, name and age could combine to be the key value 114, in which name is the most significant key. In such an example, QPS 102 would first compare the names of two entries from index to one another to determine the largest name entry. Then, if the name values were equal, QPS 102 would compare the age values. The name, age combination would then be stored as LKV 118 and be used to determine the next entry 122.

Figure 2:
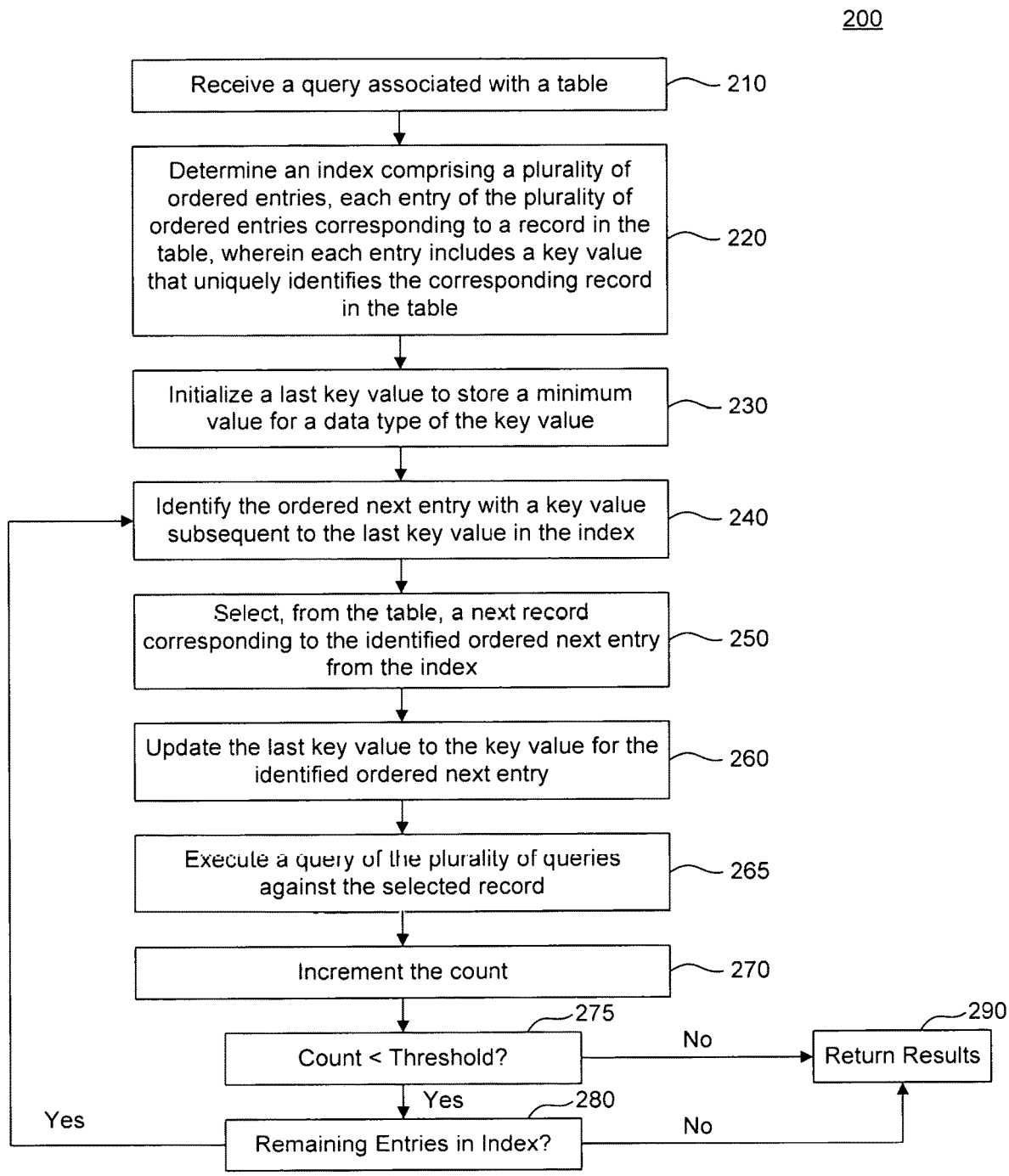
FIG. 2 is a flowchart illustrating example operations of a query processing system (QPS), according to some embodiments.

FIG. 2 is a flowchart 200 illustrating example operations of a query processing system (QPS) 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, a query associated with a table is received. For example, QPS 102 may receive LRQ 108. In an embodiment, QPS 102 may determine from LRQ 108, one or more tables 104 against which LRQ 108 is to be executed.

In 220, an index including a plurality of ordered entries is determined, each entry of the plurality of ordered entries corresponding to a record in the table. For example, ordered index 112 may include a number of entries which are arranged in either ascending or descending order relative to one or more key values 114. Each entry of index 112 may correspond to a record or row of table 104.

In 230, a last key value is initialized to store a minimum value for a data type of the key value. For example, index 112 may include a key value 114 that includes one or more keys (or columns) from index 112. Each key may correspond to a particular data type 116, such as Integer, Real, etc. QPS 102 may initialize LKV 118 (for each data type 116 for each key) with a minimum value for a particular data type 116.

In an embodiment, if index 112 is an ascending ordered index, then LKV 118 may be initialized with any value that is less than a range of values for each of the keys. For example, if key value 114 only includes a single Integer key, and the entries in index for the key value are: 4, 7, 8, 10, and 42, then LKV 118 may be initialized with any integer value less than 4.

In 240, the ordered next entry with a key value subsequent to the last key value in the index is identified. For example, QPS 102 may determine a next entry 122 from index 112. In an embodiment, in a first iteration (after initialization of LKV 118 and before processing any entries of index 112), the first entry of index 112 may be selected as next entry 112 without checking the LKV 118. The LKV 118 may then be set to the key value 114 of the first entry, or the key value 114 of the last entry of a chunk of entries selected from index 112. In any subsequent iterations, QPS 120 may execute IF 120 to compare one or more key values 114 of index against LKV 118 to determine a next entry 122.

In 250, a next record corresponding to the identified ordered next entry from the index is selected from the table. For example, next entry 122 may correspond to a next row or next record 124 from table 104. In an embodiment, next entry 122 may include a link or memory address which may identify and be used to access a corresponding row in table 104.

In 260, the last key value to the key value for the identified ordered next entry is selected. For example, QPS 102 may identify the key value 114 for next entry 122, and set the key value 114 as LKV 118. In an embodiment, LKV 118 may be set to the key value 114 of next entry 122, which may be the last selected entry from index 112 from a selected chunk of multiple entries.

In 265, a query of the plurality of queries is executed against the selected record. For example, LRQ 108 may be executed against the identified next record(s) 124 of table 104, as corresponding to the selected chunk of entries from index 112.

In 270, the count is incremented. For example, for each entry selected from index 112, count 128 may be incremented.

In 275, it is determined if the count is less than a threshold. For example, each time count 128 is incremented, QPS 102 may compare count to see if it's less than threshold 126. If count is equal to threshold 128, then intermediate results may be generated in 290.

In 280, it is determined if there are any remaining entries in the index. For example, if threshold is set to 200, and only 50 entries from index 112 have been processed, then if there is a remaining entry, the next entry 122 may be identified from index in 240. If however, there are no more remaining entries, then processing continues to 290.

In 290, results are returned. For example, after each iteration or execution of LRQ 108 against one or more rows or records of table 104, intermediate results 110 may be generated an unioned with any previously generated intermediate results 110. If there are no more remaining entries in index 112, the results may be returned as final, and LRQ 108 processing may complete (and any shared resources may be released or unlocked).

Figure 3B:
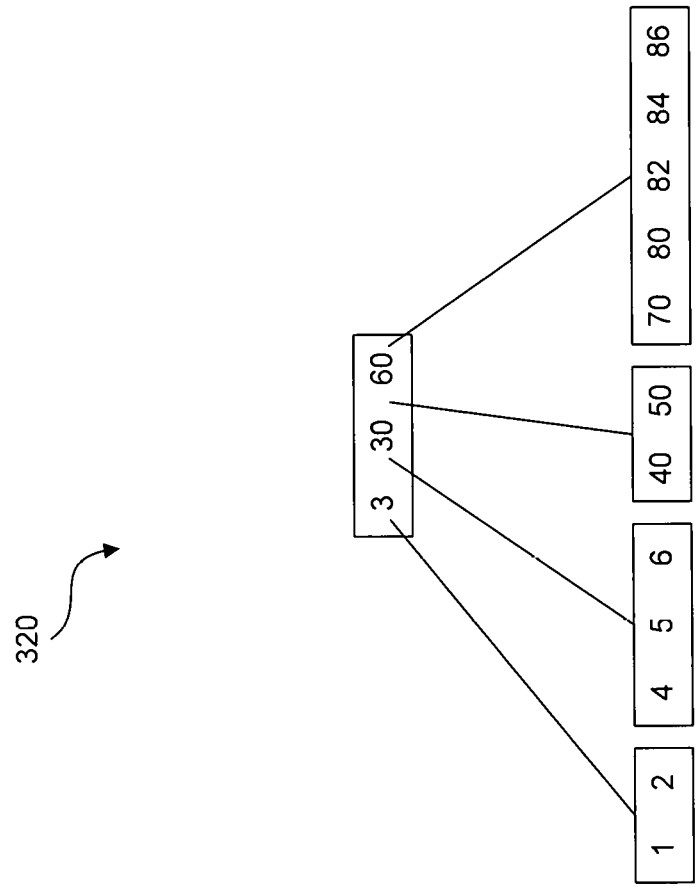
FIGS. 3A and 3B illustrate example functionality of a B-tree as may be used by the QPS, according to some example embodiments.
Figure 3A:
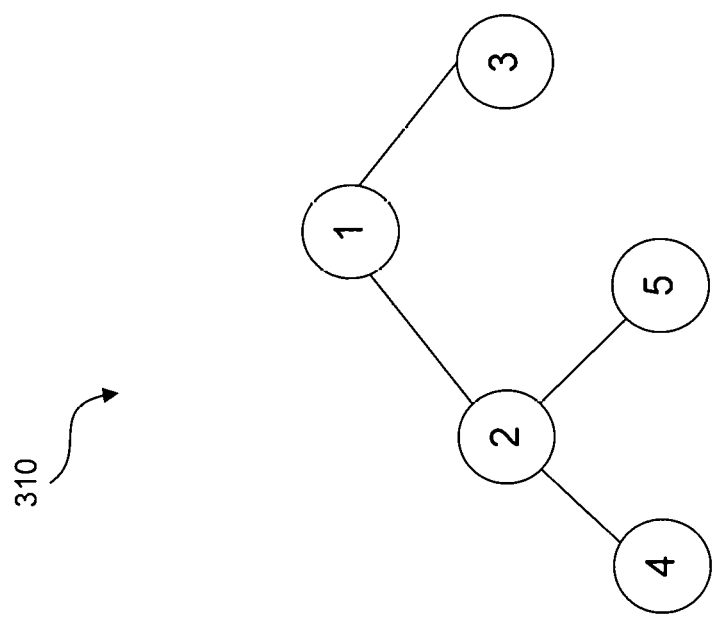

FIGS. 3A and 3B illustrate example functionality of a B-tree as may be used by QPS 102, according to some example embodiments. A B-tree 310 is a self-balancing search tree that may be used to reduce the number of disk accesses when all the data (e.g., of a table 104) cannot fit in main memory. In traversing the B-tree (of an index 112), QPS 102 may begin with the root node, and proceed down from the leftmost child to the rightmost child in each level, as illustrated in FIG. 3A. The numbers in the nodes of 310 illustrate an example traversal of the B-tree.

In an embodiment, QPS 102 may navigate or process the chunks of data of database 106 by leveraging the ordering property of a B-tree. The B-tree node size may be set to be equal to the chunk size or another disk block size.

With regard to the ordering property, the keys of the nodes of the B-tree may be sorted in increasing order as illustrated in 320 of FIG. 3B. As illustrated, the key values 114 stored in each row of the B-tree 320 may ordered in ascending or descending order across the various nodes of the row. For example, the child between two keys k1 and k2 (in which k1 is a most significant column of an index 112) may include all the keys in the range from k1 to k2.

Figure 4:
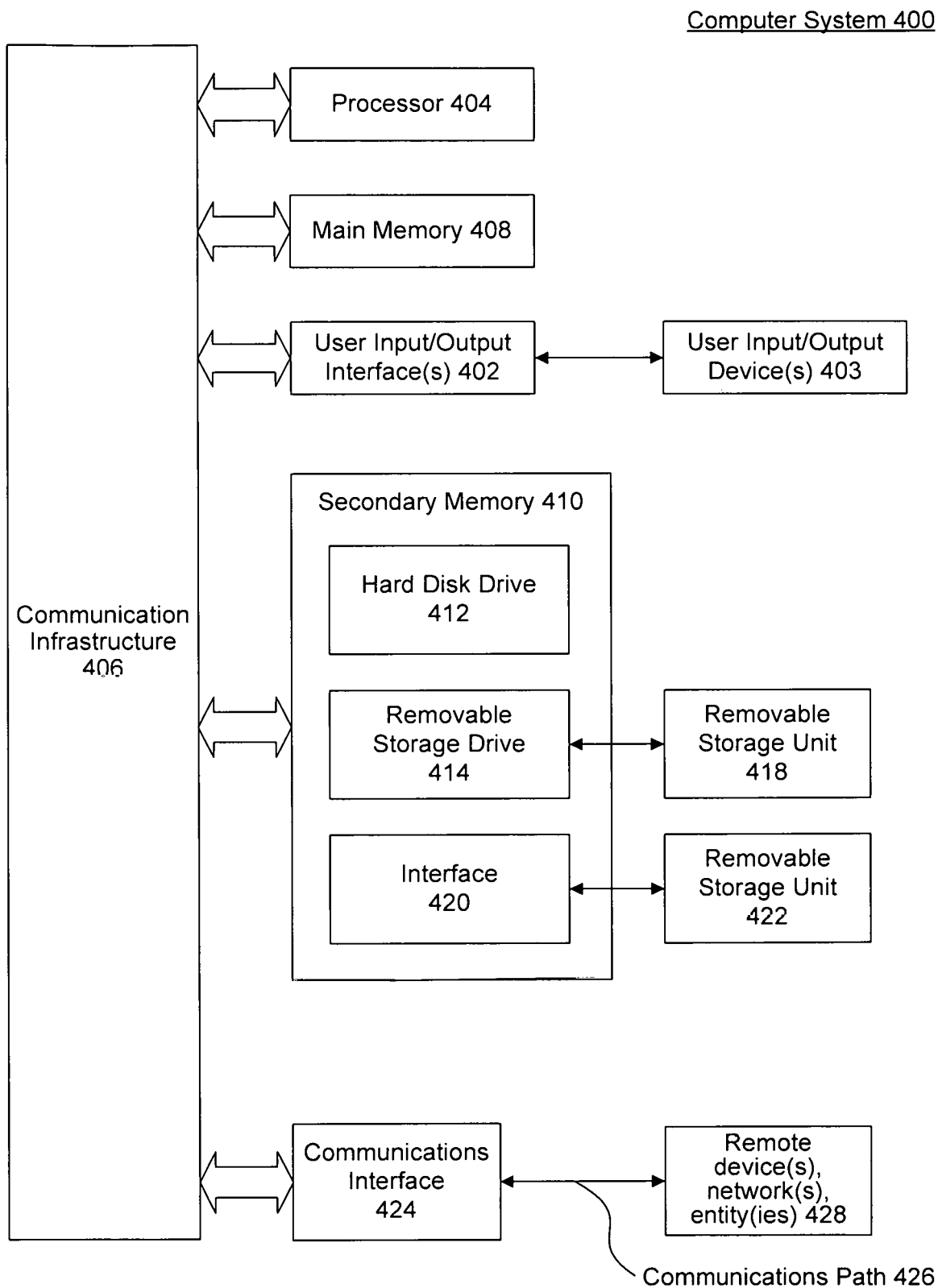
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving a query associated with a table;
determining an index comprising a plurality of ordered entries including at least:
a first entry corresponding to a first record in the table and comprising a first key value that uniquely identifies the first record in the table, and
a second entry corresponding to a second record in the table and comprising a second key value that uniquely identifies the second record in the table;
initializing, based on the index, a last key value variable comprising a first field and a second field,
wherein the last key value variable is initialized to store a minimum value for a first data type in the first field and to store a minimum value for a second data type in the second field, and
wherein the first data type and the second data type are associated with the first key value and the second key value in the index;
executing the query as a union-all of a plurality of queries, wherein each of the plurality of queries is executed against at most a threshold quantity of records from the table in accordance with the following:
initializing a count;
executing a plurality of operations comprising:
identifying an ordered next entry in the index, the identified ordered next entry comprising a key value that is subsequent to the last key value variable;
selecting, from the table, a next record corresponding to the identified ordered next entry from the index, wherein the key value in the identified ordered next entry uniquely identifies the selected next record;
updating the last key value variable by setting the last key value variable to the key value that uniquely identifies the selected next record;
executing a query of the plurality of queries against the selected next record; and
incrementing the count; and
while the count is less than or equal to the threshold quantity and at least one entry remains in the ordered index, repeating execution of the plurality of operations.

2. The method of claim 1, wherein the index comprises an ascending ordered index, and wherein the identifying comprises identifying the ordered next entry with the key value greater than the last key value variable in the ascending ordered index.

3. The method of claim 1, wherein the index comprises an descending ordered index, and wherein the identifying comprises identifying the ordered next entry with the key value less than the last key value variable in the descending ordered index.

4. The method of claim 1, wherein each of the first key value and the second key value comprises a plurality of fields.

5. The method of claim 4, wherein the plurality of fields comprises a field corresponding to the first data type and a field corresponding to the second data type.

6. The method of claim 1, wherein the identifying comprises:
executing an idempotent function against the last key value variable and at least one entry from the ordered index to identify the larger of the last key value variable and the at least one entry.

7. The method of claim 1, wherein the index includes values from a plurality of columns from the table that are ordered from a most significant column to a least significant column, and wherein the order of the columns in the index is different from an order of the columns in the table.

8. A system, comprising:
a memory; and
at least one processor coupled to the memory and configured to:
receive a query associated with a table;
determine an index comprising a plurality of ordered entries including at least:
a first entry corresponding to a first record in the table and comprising a first key value that uniquely identifies the first record in the table, and
a second entry corresponding to a second record in the table and comprising a second key value that uniquely identifies the second record in the table;
initialize, based on the index, a last key value variable comprising a first field and a second field,
wherein the last key value variable is initialized to store a minimum value for a first data type in the first field and to store a minimum value for a second data type in the second field, and
wherein the first data type and the second data type are associated with the first key value and the second key value in the index;
execute the query as a union-all of a plurality of queries, wherein each of the plurality of queries is executed against at most a threshold quantity of records from the table in accordance with the following:
initialize a count;
while the count is less than or equal to the threshold quantity and at least one entry remains in the ordered index:

identify an ordered next entry in the index, the identified ordered next entry comprising a key value that is subsequent to the last key value variable;

select, from the table, a next record corresponding to the identified ordered next entry from the index, wherein the key value in the identified ordered next entry uniquely identifies the selected next record;

update the last key value variable by setting the last key value variable to the key value that uniquely identifies the selected next record;

execute a query of the plurality of queries against the selected next record; and increment the count.

9. The system of claim 8, wherein the index comprises an ascending ordered index, and wherein the at least one processor that identifies is configured to identify the ordered next entry with the key value greater than the last key value variable in the ascending ordered index.

10. The system of claim 8, wherein the index comprises an descending ordered index, wherein the at least one processor that identifies is configured to identify the ordered next entry with the key value less than the last key value variable in the descending ordered index.

11. The system of claim 8, wherein each of the first key value and the second key value comprises a plurality of fields.

12. The system of claim 11, wherein the plurality of fields comprises a field corresponding to the first data type and a field corresponding to the second data type.

13. The system of claim 8, wherein the at least one processor that identifies is configured to:
execute an idempotent function against the last key value variable and at least one entry from the ordered index to identify the larger of the last key value variable and the at least one entry.

14. The system of claim 8, wherein the index includes values from a plurality of columns from the table that are ordered from a most significant column to a least significant column, and wherein the order of the columns in the index is different from an order of the columns in the table.

15. A non-transitory computer-readable device having instructions stored thereon that, when executed by at least one computing device, cause the at least one computing device to perform operations comprising:

receiving a query associated with a table;

determining an index comprising a plurality of ordered entries including at least:

a first entry corresponding to a first record in the table and comprising a first key value that uniquely identifies the first record in the table, and a second entry corresponding to a second record in the table and comprising a second key value that uniquely identifies the second record in the table;

initializing, based on the index, a last key value variable comprising a first field and a second field, wherein the last key value variable is initialized to store a minimum value for a first data type in the first field and to store a minimum value for a second data type in the second field, and wherein the first data type and the second data type are associated with the first key value and the second key value in the index;

executing the query as a union-all of a plurality of queries, wherein each of the plurality of queries is executed against at most a threshold quantity of records from the table in accordance with the following:

initializing a count;

while the count is less than or equal to the threshold quantity and at least one entry remains in the ordered index:

identifying an ordered next entry in the index, the identified ordered next entry comprising a key value that is subsequent to the last key value;

selecting, from the table, a next record corresponding to the identified ordered next entry from the index, wherein the key value in the identified ordered next entry uniquely identifies the selected next record;

updating the last key value variable by setting the last key value variable to the key value that uniquely identifies the selected next record;

executing a query of the plurality of queries against the selected next record; and incrementing the count.

16. The non-transitory computer-readable device of claim 15, wherein the index comprises an ascending ordered index, and wherein the processor that performs the identifying, further performs operations comprising identifying the ordered next entry with the key value greater than the last key value variable in the ascending ordered index.

17. The non-transitory computer-readable device of claim 15, wherein the index comprises an descending ordered index, and wherein the processor that performs the identifying, further performs operations comprising identifying the ordered next entry with the key value less than the last key value variable in the descending ordered index.

18. The non-transitory computer-readable device of claim 15, wherein:

each of the first key value and the second key value comprises a field corresponding to the first data type and a field corresponding to the second data type.

* * * * *